United States Patent [19]

Ohtsuki

[11] Patent Number: 4,847,679
[45] Date of Patent: Jul. 11, 1989

[54] MULTIPLEX CHROMINANCE GAIN CONTROL AND MATRIX USING A SINGLE MULTIPLIER AND A COEFFICIENT SHIFT REGISTER

[75] Inventor: Toshimasa Ohtsuki, Tokyo, Japan

[73] Assignee: Kabushiki Kaisha Toshiba, Kawasaki, Japan

[21] Appl. No.: 162,677

[22] Filed: Mar. 1, 1988

[30] Foreign Application Priority Data

Mar. 23, 1987 [JP] Japan .................. 62-68258

[51] Int. Cl.⁴ .............................. H04N 9/68
[52] U.S. Cl. ........................ 358/27; 358/28; 358/30
[58] Field of Search .............. 358/27, 28, 30, 40

[56] References Cited

U.S. PATENT DOCUMENTS

| | | | |
|---|---|---|---|
| 4,542,402 | 9/1985 | Ader | 358/30 |
| 4,554,576 | 11/1985 | Kao | 358/28 |
| 4,568,967 | 2/1986 | Freyberger et al. | 358/40 |
| 4,661,841 | 4/1987 | Suzuki | 358/27 |

FOREIGN PATENT DOCUMENTS

61-131993  6/1986  Japan .
61-230589  10/1986  Japan .

Primary Examiner—John W. Shepperd
Attorney, Agent, or Firm—Cushman, Darby & Cushman

[57] ABSTRACT

A digital chroma signal processing apparatus wherein control signals represent the burst period, the image period and the remaining period of a digital chrominance signal. A multiplier receives a selected one of an ACC signal and the chrominance signal, multiplies it with a second signal and outputs the resultant produced. A matrix coefficient section includes a generator to generate a plurality of matrix coefficients; a cyclic arrangement of dynamic shift registers to store selected matrix coefficients; and a multiplexer to input to the dynamic shift registers, in accordance with the control signal, a selected one of the product signal and the output signal of the dynamic shift registers. The second signal is generated by a selection between the ACC signal and the output signal of the shift registers. The resultant chrominance signal processing circuit is thus controlled by a small number of simple control signals.

4 Claims, 6 Drawing Sheets

MULTIPLEX CHROMINANCE GAIN CONTROL AND MATRIX USING A SINGLE MULTIPLIER AND A COEFFICIENT SHIFT REGISTER

BACKGROUND OF THE INVENTION

1. Field of the Invention

This invention relates to a digital chroma signal processing circuit and, more particularly, to a circuit for variously processing digital chroma signals in digital video apparatuses including digital TV sets and digital VTRs.

2. Description of the related art

Recently, as the processing speed and integrating density of ICs have been greatly improved with advances in the semiconductor technology, digital video signal processing can be performed at low cost. For example, a digital TV set, which digitally performs signal processing upon detection of a video signal, has the following advantages compared with existing analog TV sets.

(1) New media such as a teletext receiver can be digitally connected to the digital TV set without difficulty.

(2) Picture quality displayed on CRT can be improved using a memory.

(3) Each broadcasting scheme can be adopted by software.

(4) Reliability with respect to changes in quality or the like with the lapse of time can be improved.

(5) The number of parts can be reduced, adjustment may not be required, and automatic adjustment can be realized.

An invention disclosed in U.S. Pat. No. 4,661,841 entitled as "Color Signal Processing Circuit" and patented to the present applicant aims to facilitate fabrication of an IC serving as a color signal processor used in a digital TV set having the above-described advantages.

However, the IC realized by the above prior invention need be further improved because the market demands that multi-function, high-performance video apparatuses should be further advanced at lower cost. More specifically, since such an IC requires a large number of static registers, hardware becomes bulky. In addition, a wiring region must be enlarged because a large number of control signals are required.

Note that such drawbacks are found when the above-described IC is applied to a digital VTR.

SUMMARY OF THE INVENTION

It is, therefore, an object of the present invention to provide a new and improved digital chroma signal processing circuit, in which the scale of hardware and a wiring region can be minimized, thereby forming an IC, the cost of which can be further decreased.

According to the present invention, there is provided a digital chroma signal processing apparatus, comprising:

multiplying means for receiving a first signal and a second signal and outputting a third signal representing a product of the first and second signals;

transmission means for transmitting a digital chrominance signals as the first signal to the multiplying means;

matrix coefficient means for sequentially selecting predetermined matrix coefficients from a plurality of matrix coefficients in selective response to the third signal, said matrix coefficient means including generating means for generating the plurality of matrix coefficients, shift means for cyclically shifting the plurality of matrix coefficients output from the generating means in a predetermined order, and output means for sequentially outputting the plurality of matrix coefficients as the second signal cyclically shifted by the shift means in the predetermined order; and ACC means, coupled between the multiplying means, the transmission means, and the output means of the matrix coefficient means, for generating an ACC signal required for matrix operation and color demodulation by using the third signal.

BRIEF DESCRIPTION OF THE DRAWINGS

These and other objects and features of the present invention can be understood through the following embodiment by reference to the accompanying drawings, in which:

FIGS. 3A to 3G are timing charts of clock signals supplied to the respective parts of the chroma signal processing circuit;

FIGS. 4A to 4G are views illustrating outputs of the respective parts of the chroma signal processing circuit;

FIGS. 6A to 6M are timing charts of clock signals supplied to the respective parts of the chroma signal processing circuit in FIG. 5.

DETAILED DESCRIPTION OF THE PREFERRED EMBODIMENT

First, a digital system of a digital TV set, to which an embodiment of the present invention is applied, will be generally described below with reference to FIG. 1.

Figure 1:
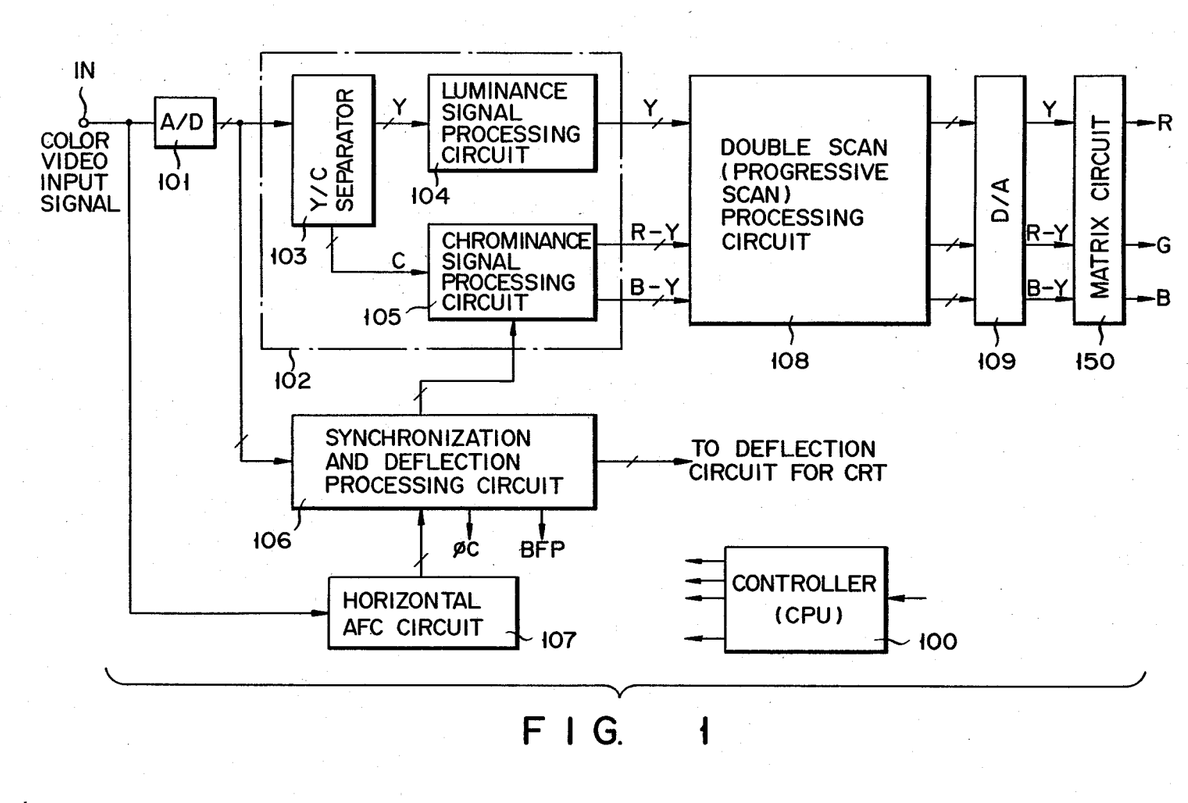
FIG. 1 is a block diagram showing a main part of a digital TV system to which the present invention is applied.

As shown in FIG. 1, an analog video signal supplied to input terminal IN is converted into a digital video signal by A/D converter 101. A/D converter 101 samples an analog video signal using clock signal 4fsc (fsc: color subcarrier frequency) synchronized with a burst signal and outputs a digital video signal having a quantized value of 8 bits. Y/C separator 103 separates this digital signal into the Y (luminance signal) component and the C (chrominance signal) components. Y/C separator 103 aims to obtain the Y and C signals free from cross-color interference, which is caused when the luminance signal is mixed in the chrominance signals. For this purpose, Y/C separator 103 performs Y/C separation in a horizontal/vertical two-dimensional frequency range using a 2H (H: horizontal period) comb filter having a line memory constituted by, e.g., a dynamic RAM.

The Y signal output from Y/C separator 103 is processed by luminance signal processing circuit 104, wherein horizontal/vertical edge emphasis and Y nonlinear processing are mainly performed. For the purpose of edge emphasis, luminance signal processing circuit 104 includes a digital filter for extracting an edge from the Y signal and a pipelined multiplier having e.g., 8×4, or 8×3 bits for adjusting a gain of the extracted signal and adding the resultant signal to the original Y signal. In addition, in order to provide the Y nonlinear characteristic to the Y signal, luminance signal processing circuit 104 includes a pipelined multiplier having, e.g., 8×4 bits and an adder.

The C signal output from Y/C separator 103 is processed by chrominance signal processing circuit 105 and subjected to bandpass filter processing, matrix color demodulation processing, ACC (Automatic Color Control) processing, and color killer processing. For this purpose, chrominance signal processing circuit 105 includes a digital bandpass filter for removing an unnecessary Y component from the C signal, and a pipelined multiplier having, e.g., 9×9 bits and serving as a matrix color demodulation circuit for adjusting hue, saturation, and the like of the C signal upon removal of the unnecessary Y component so as to obtain color difference signals R−Y and B−Y. In addition, chrominance signal processing circuit 105 includes a color killer circuit, a matrix circuit, and an ACC circuit which cooperates with a multiplier to reliably perform color reproduction.

Y/C separator 103, luminance signal processing circuit 104, and chrominance signal processing circuit 105 are formed into an IC as video signal processing circuit 102.

The digital video signal from A/D converter 101 is also supplied to synchronization and deflection processing circuit 106, which is formed into an IC, because the color demodulation in chrominance signal processing circuit 105 need be controlled in synchronism with a phase of clock 4fsc. For this purpose, synchronization and deflection processing circuit 106 includes a phase locked loop (PLL) for generating color sync signal φc and burst gate signal BFP. In addition, in order to function as a CRT deflection circuit, circuit 106 includes a vertical synchronization circuit for obtaining a vertical sync detection signal from the digital video signal, a horizontal synchronization circuit for obtaining a horizontal drive pulse on the basis of an output from horizontal AFC circuit 107.

In order to obtain high image quality, luminance signal Y, and color difference signals R−Y and B−Y from video signal processing circuit 102, which is formed into an IC, are supplied to double scan (progressive scan) processing circuit 108, which is formed into an IC by a plurality of chips including field and line memories. As is well known, scan processing circuit 108 doubles the scanning lines in an image (interlaced scanning→noninterlaced scanning) to improve a vertical resolution and minimize unsteady flickering (so-called line flicker) on the screen. In the case of the progressive scan processing circuit, as is well known, three-dimensional processing is performed using horizontal components, vertical components' and time as follows. In a motionless picture area, interpolated scanning lines are formed using picture elements of the immediately preceding field, whereas in a picture area with motion, interpolated scanning lines are formed using picture elements of adjacent scanning lines of one field, thereby finely performing motion adaptive processing of each picture element.

After the scan processing for high image quality is applied to signals Y, R−Y, and B−Y, those signals are respectively converted by D/A converter 109 into analog signals and then converted by matrix circuit into the R, G, and B signals.

Note that reference numeral 100 in FIG. 1 denotes a controller (CPU) for supplying clocks and timing signals required for processing in each circuit described above.

The present invention relates to chrominance signal processing circuit 105 included in video signal processing circuit 102 as an IC in the above-described digital TV system and, more particularly, to an improvement in U.S. Pat. No. 4,661,841 as the prior invention.

Figure 5:
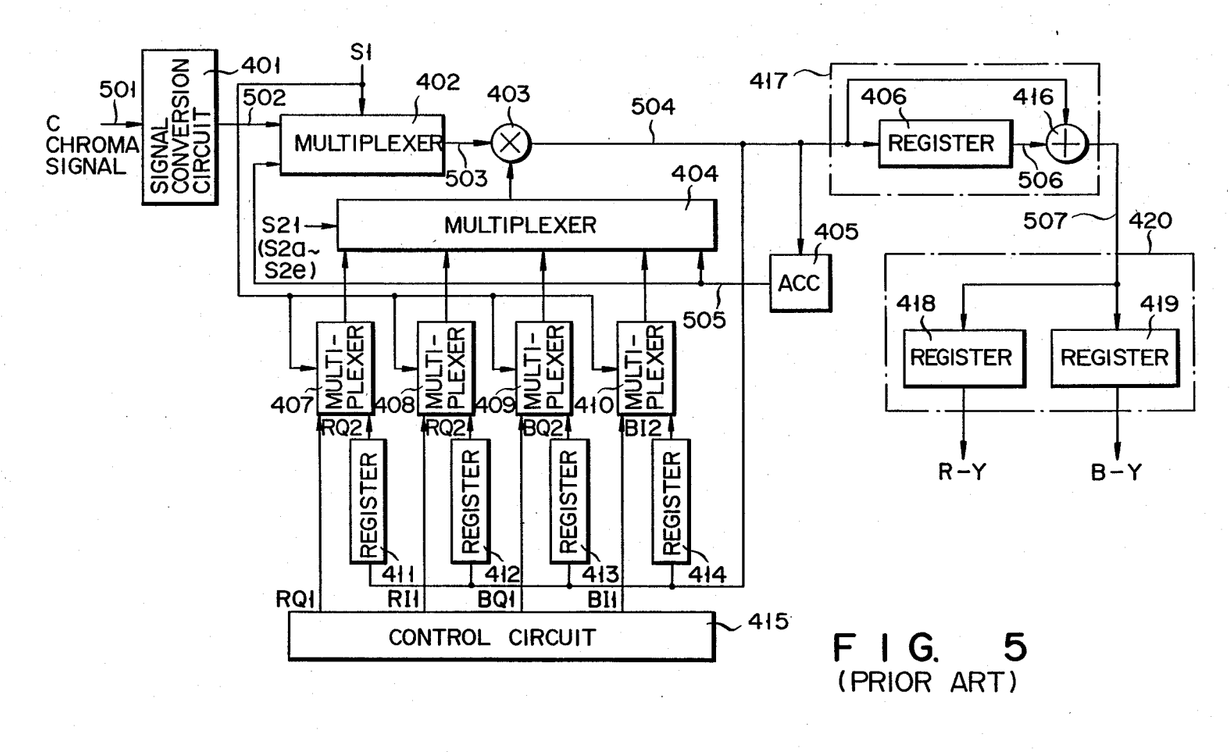
FIG. 5 is a block diagram of conventional chroma signal processing circuit.
Figure 6:
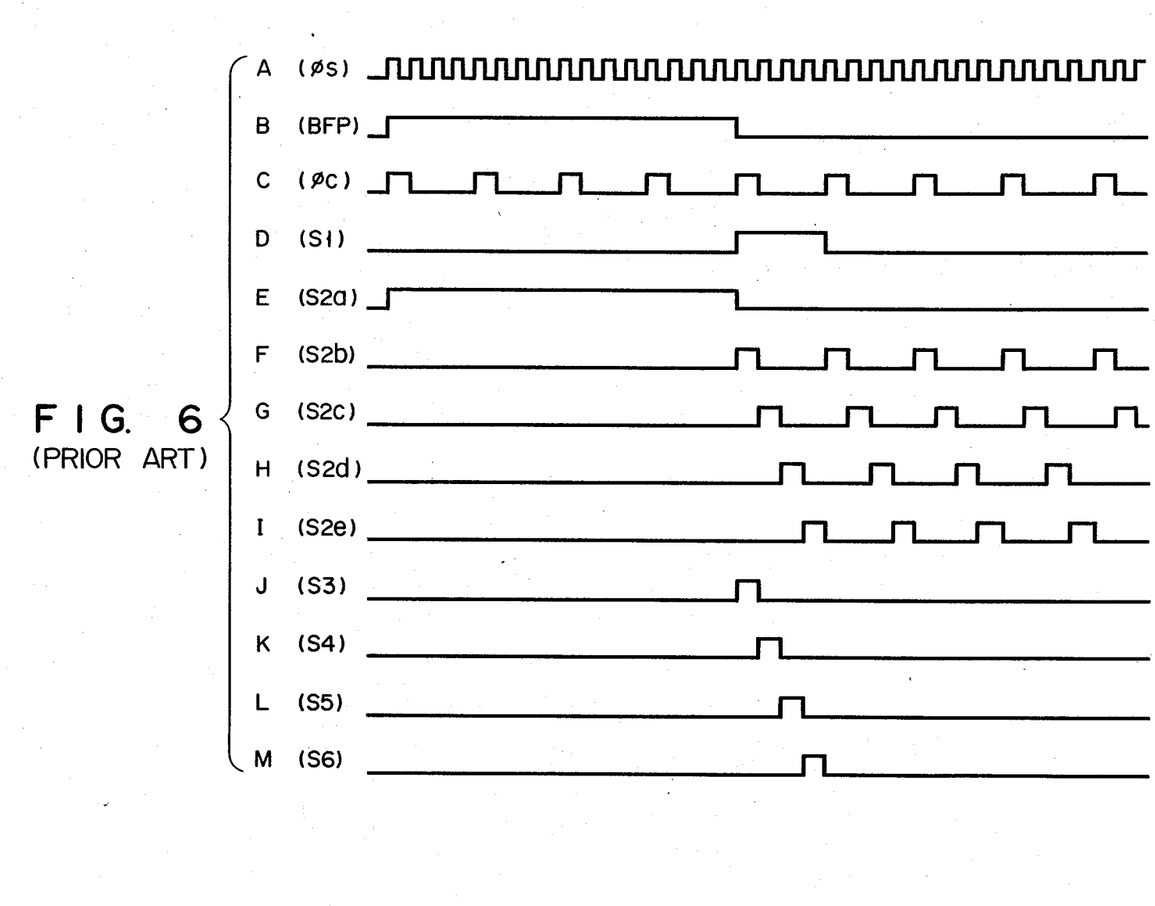

The prior invention will be generally described below with reference to FIGS. 5 and 6. FIGS. 6A, 6B, and 6C show fundamental clock φs, burst gate signal BFP, and color sync signal φc, respectively. The chrominance signal processing circuit of the prior art in FIG. 5 causes an A/D converter (not shown) to convert an analog video signal into a digital video signal, and then performs automatic color control (ACC), color saturation control, and matrix operation for chrominance signal C, which has been separated from a luminance signal by a Y/C separator upon separation of luminance and chrominance signals (Y/C separation), thereby demodulating chrominance signal C into color difference signals R−Y and B−Y. Matrix operation and color demodulation will be described in detail.

Matrix operation and color demodulation are performed by applying an operation represented by equation (1) to chrominance signal 501 supplied from the Y/C separator as the C signal in its image period.

$$\begin{pmatrix} B-Y \\ R-Y \end{pmatrix} = \begin{pmatrix} RQ & RI \\ BQ & BI \end{pmatrix} \begin{pmatrix} Q \\ I \end{pmatrix} \quad (1)$$

where I and Q are chrominance signals, RQ to BI are matrix coefficients, and R−Y and B−Y are color difference signals.

Chrominance signal 501 is supplied to signal conversion circuit 401 and converted into chrominance signal 502 composed of a data format of Q, I, Q, I, ... Chrominance signal 502 is supplied to multiplexer 402 together with ACC signal 505 output from ACC circuit 405 to be described later. In response to control signal S1 (FIG. 6D), multiplexer 402 selects chrominance signal 502 in its burst and image periods while selecting ACC signal 505 in other periods, and outputs them to multiplier 403. First matrix coefficients RQ1 to BI1, which are output signals from control circuit 415, and second matrix coefficients RQ2 to BI2, which are output signals from registers 411 to 414, are respectively supplied to multiplexers 407 to 410. In response to control signal S1 (FIG. 6D), multiplexers 407 to 410 select second matrix coefficients RQ2 to BI2 in the image period of chrominance signal 502 and selects first matrix coefficients RQ1 to BI1 in other periods. The selected coefficients are supplied to multiplexer 404 together with ACC signal 505. Multiplexer 404 utilizes control signals S2 (S2a to S2e) (FIGS. 6E to 6I). More specifically, in the burst period of chrominance signal 502, multiplexer 404 selects the ACC signal in response to control signal S2a (FIG. 6E), in the image period, it sequentially selects second matrix coefficients RQ2 to BI2 in response to control signals S2b to S2e (FIGS. 6F to 6I), and in other periods, it sequentially selects first matrix coefficients RQ1 to BI1 in response to control signals S2b to S2e (FIGS. 6F to 6I). Then, the selected signals are output to multiplier 403. In the burst period of chrominance signal 502, multiplier 403 receives chrominance signal 502 as a multiplicand, and ACC signal 505 as a multiplier to perform a multiplication. Then, product 504 is supplied to ACC circuit 405 and converted into new ACC signal 505. In the periods other than the burst and image periods, multiplier 403 receives ACC signal 505 as a multiplicand while sequentially receiving first matrix coefficients RQ1 to BI1 as multipliers to perform multiplications. Then, the resultant products 504 are sequentially stored in registers 411 to 414 as second matrix coefficients RQ2 to BI2 in accordance with control signals S3 to S6 (FIGS. 6J to 6M). In the image period, multiplier 403 receives chrominance signal 502 and second matrix coefficients RQ2 to BI2 as a multiplicand and multipliers, respectively, to perform multiplications. Then, the resultant products 504 are supplied to adding stage 417 constituted by register 406 and adder 416, and used to obtain a color difference signal (including R−Y and B−Y components) 507. Color difference signal 507 are supplied to separation circuit 420 consisting of registers 418 and 419, and separated into the R−Y and B−Y signals.

In the chrominance signal processing circuit of the prior invention described above, ACC processing, color saturation control, hue control, and time-divisional processing are performed using a single multiplier. However, in order to perform time-divisional processing, a large number of static registers are required to store data. In addition, when data is output to multiplier 403, a selection circuit (multiplexer) is used, and hence a large number of control signals are required. Accordingly, there is yet room for improvement in the prior art upon formation of an IC in terms of the quantity of hardware and the wiring region.

Next, an embodiment of the present invention will be described with below reference to the accompanying drawings.

Figure 2:
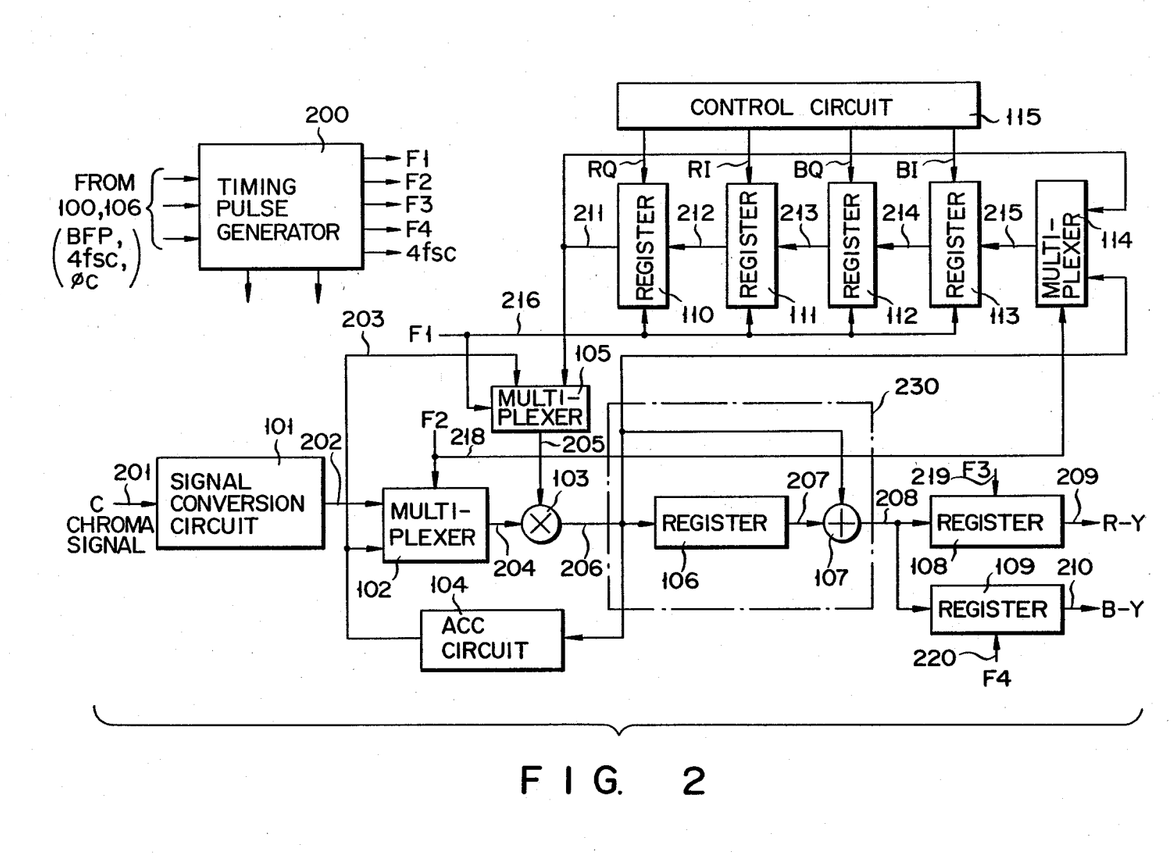
FIG. 2 is a block diagram of a chroma signal processing circuit according to an embodiment of the present invention.

FIG. 2 shows the embodiment of the present invention. In this case, a fundamental clock is set to be four times color subcarrier frequency fsc. Chrominance signal 201 supplied from the Y/C separator (refer to FIG. 1) as the C signal is supplied to signal conversion converter 101 and converted into chrominance signal 202 composed of a data format of . . . Q, I, Q, I. Chrominance signal 202 is supplied to multiplexer 102 together with ACC signal 203 output from automatic color control (ACC) circuit 104 to be described later. In response to control signal F2, multiplexer 102 selects chrominance or ACC signal 202 or 203 and outputs it to multiplier 103. First matrix coefficients RQ1 to BI1, which are output signals from control circuit 115, are respectively stored in registers 110 to 113 in response to control signal F1. Registers 110 to 113 constitute a cyclic arrangement of dynamic shift registers. Output signal 211 from register 110 is supplied to multiplexer 114 together with output signal 206 from multiplier 103. Multiplexer 114 selects whether to cause registers 110 to 113 to constitute the cyclic arrangement or to introduce output signal 206 from multiplier 103 to register 113 in accordance with control signal F2. Output signal 211 from register 110 is supplied to multiplexer 105 together with ACC signal 203. Multiplexer 105 selects output signal 211 from register 110 or ACC signal 203 and outputs it to multiplier 103 in response to control signal F1. Output signal 206 from multiplier 103 is supplied to ACC circuit 104 and adding stage 230. Output signal 208 from adding stage circuit 230 is supplied to registers 108 and 109, and separated into color difference signals R−Y and B−Y in accordance with control signals F3 and F4. Note that reference numeral 200 in FIG. 2 denotes a timing generator for generating clocks of 4fsc and control signals F1 to F4.

The operations of the embodiment will be described in the burst period, the image period, and the other periods of chrominance signal 201, respectively, with reference to FIGS. 3A to 3G, and 4A to 4G. FIGS. 3A to 3G show control signals, respectively. FIGS. 4A to 4G show output signals from the respective circuits.

Figure 3:
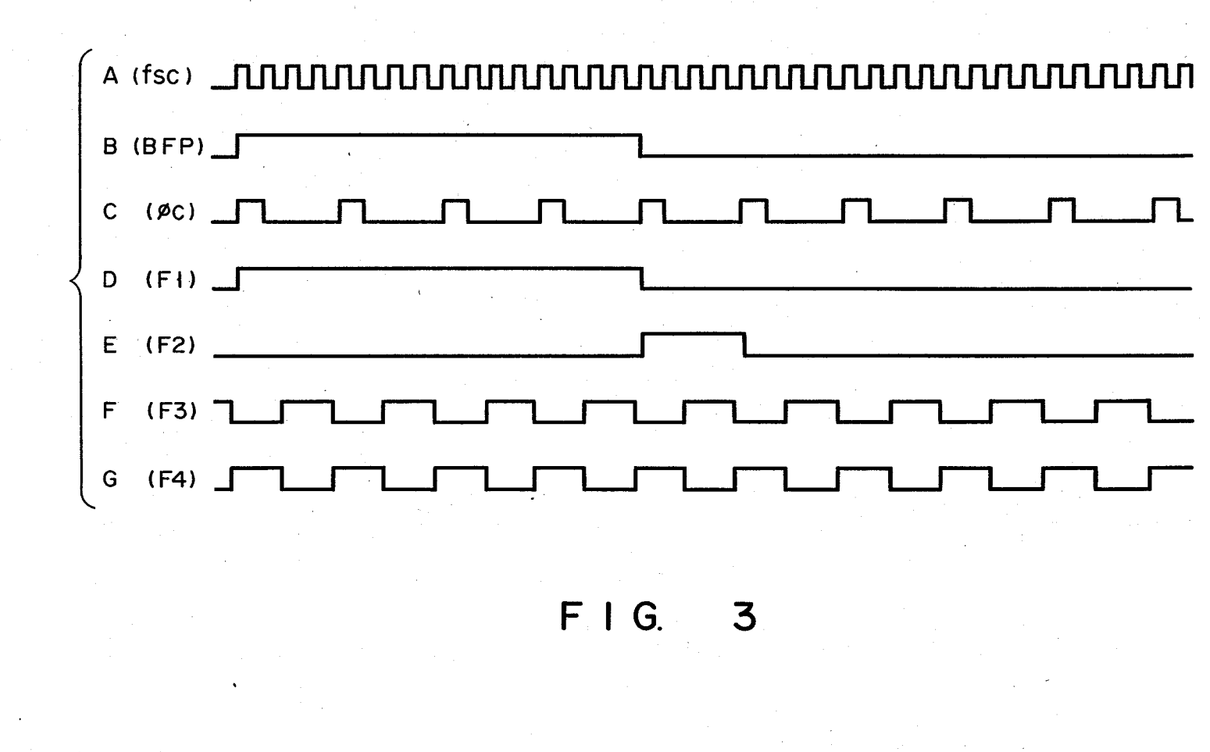

In the burst period, multiplexer 102 selects chrominance signal 202 (FIG. 4C), which is an output signal from signal conversion circuit 101, in accordance with control signal F2 (FIG. 3E). Multiplexer 105 selects ACC signal 203 (FIG. 4D) in accordance with control signal F1 (FIG. 3D). Therefore, multiplier 103 performs a multiplication using chrominance signal (a burst signal) 202 and ACC signal 203 as a multiplier and a multiplicand, respectively. ACC circuit 104 receives product 206 (FIG. 4E) from multiplier 103 and outputs new ACC signal 203. Registers 110 to 113 store first matrix coefficients RQ1 to BI1 in accordance with control signal F1 (FIG. 3D). In this case, control signal F1 is synchronized with signal BFP (FIG. 3B) representing the burst period and color sync signal φc (FIG. 3C).

Figure 4:
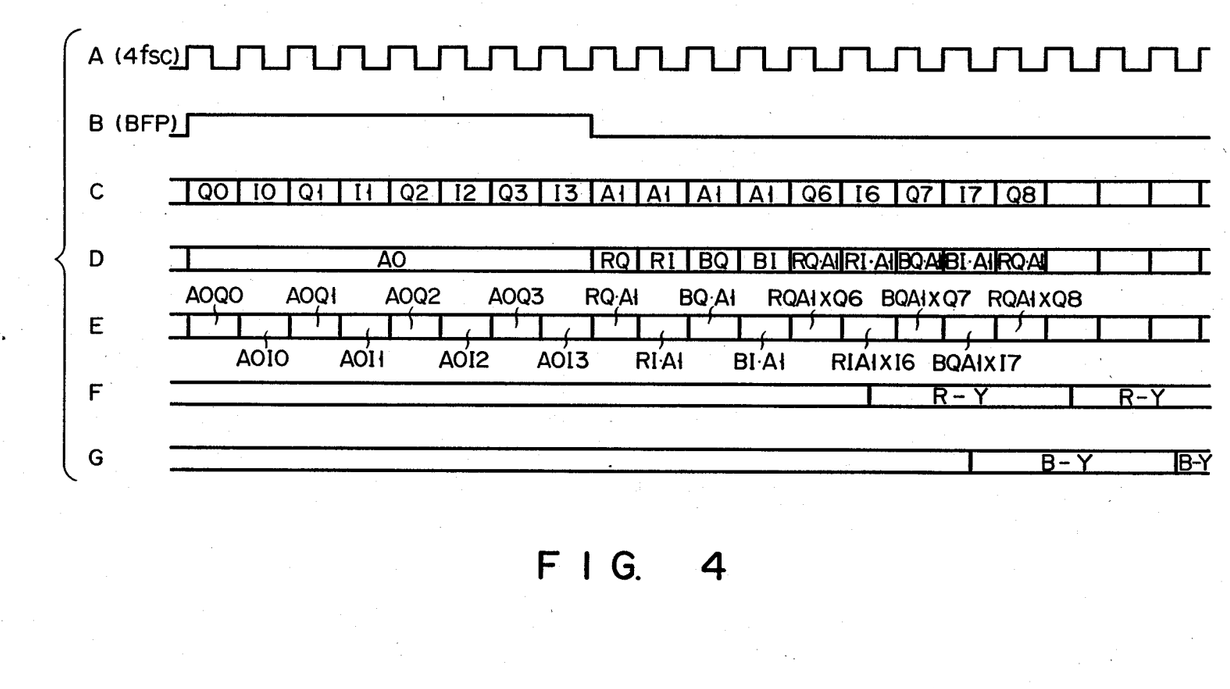

In the periods other than the burst and image periods, multiplexer 102 selects ACC signal 203 (FIG. 4C) for a period of time corresponding to the four fundamental clocks in accordance with control signal F2 (FIG. 3E). In this case, control signal F2 (FIG. 3E) is synchronized with color snyc φc (FIG. 3C). Multiplexer 105 sequentially selects first matrix coefficients RQ1 to BI1 (FIG. 4D), which are output signals from register 110, in accordance with control signal F1 (FIG. 3D). At this time, multiplier 103 sequentially receives ACC signal 203 as a multiplier and first matrix coefficients RQ1 to BI1 as multiplicands, and outputs second matrix coefficients (FIG. 4E). Multiplexer 114 selects second matrix coefficients RQA0 to BIA0 (206) in accordance with control signal F2 (FIG. 3E) and sequentially outputs them to register 113. Therefore, second matrix coefficients RQA0 to BIA0 are respectively stored in registers 110 to 113 during a period when control signal F2 (FIG. 3E) is set at "H" level.

In the image period of chrominance signal 201, multiplexer 114 selects output signal 211 from register 110 in accordance with control signal F2 (FIG. 3E) to cause registers 110 to 113 to constitute the cyclic arrangement. Subsequently, second matrix coefficients RQA0 to BIA0 (FIG. 4E) are sequentially output from register 110 in units of the fundamental clocks. Multiplexer 102 selects chrominance signal 202 in accordance with control signal F2 (FIG. 3E). Consequently, multiplier 103 sequentially receives chrominance signal 202 as a multiplier and second matrix coefficients RQA0 to BIA0 as multiplicands, thereby performing a matrix operation. Products 206 (FIG. 4E) output from multiplier 103 are supplied to demodulation circuit 230 constituted by register 106 and adder 107, and converted into a color difference signal 208 (including R−Y and B−Y components). Color difference signal 208 are supplied to registers 108 and 109, and separated into R−Y and B−Y signals 209 and 210 (FIGS. 4F and 4G) in accordance with control signals F3 and F4 (FIGS. 3F and 3G).

Thus, according to the present invention, the output circuit for outputting matrix coefficients is designed to be of a dynamic type instead of a static one so as to function as a multi-function type circuit. As a result, the number of gates can be decreased by 300 compared with that of the prior art.

According to the above-described present invention, the matrix coefficient output circuit is designed to have a cyclic arrangement so as to constitute a dynamic shift register. Therefore, the system can be operated by simple control signals and the quantity of hardware can be reduced, thereby obtaining a chroma signal processing circuit suitable for an IC.

What is claimed is:

1. A digital chroma signal processing apparatus comprising:

signal conversion means for converting a digital chroma signal into a signal having a data format in which Q and I signals are alternately arranged, said digital chroma signal including burst periods, image periods and remaining periods;

multiplying means for generating an output signal;

ACC means for generating an ACC signal based on said output signal from said multiplying means;

a plurality of storing means for storing a plurality of matrix coefficients;

means for loading a first plurality of matrix coefficients including RQ, RI, BQ and BI into said plurality of storing means during the burst period;

first selection means for selecting the signal converted by said signal conversion means in the burst period and the image period of said digital chroma signal, for selecting said ACC signal from said ACC means in the remaining periods of the digital chroma signal, and for supplying these selected signals to said multiplying means as a multiplier;

switching means for (a) cyclically shifting and sequentially outputting the first plurality of matrix coefficients in the burst period and the remaining period, and for (b) introducing the output signal from said multiplying means into said plurality of storing means to produce a second plurality of matrix coefficients including RQA, RIA, BQA and BIA signals during the remaining period, and for cyclically shifting the second plurality of matrix coefficients, and sequentially outputting the second plurality of matrix coefficients in the image period;

second selection means for (1) selecting said ACC signal from said ACC means in said burst period, (2) selecting one of said first plurality of matrix coefficients and said second plurality of matrix coefficients from said plurality of storing means in said image period and said remaining period, and (3) supplying these signals and coefficients to said multiplying means as multiplicands;

adding means for adding each output signal from said multiplying means in said image period and for outputting a result; and separation means for separating a color difference signal into R−Y and B−Y signals in accordance with the output result of said adding means in said image period.

2. An apparatus according to claim 1, wherein said plurality of storing means include a dynamic shift register.

3. A chroma signal processing circuit comprising:

A/D conversion means for converting an analog video signal to a digital video signal;

separation means for separating a color carrier signal from the digital video signal, the color carrier signal including a burst period, an image period and a remaining period;

signal conversion means for converting said color carrier signal to I and Q signals and for outputting the I and Q signals;

first selection means for selecting and outputting output signals from said signal conversion means in the burst and image periods and for selecting and outputting an automatic color control signal in said remaining period;

storing means for storing and sequentially outputting matrix coefficients;

means for loading a first set of matrix coefficients into the storing means during the burst period;

second selection means for selecting and outputting said automatic color control signal in the burst period and for selecting and outputting matrix coefficients from said storing means in said image period and said remaining period;

a multiplier for (a) receiving the output from said first selection means as a multiplier, (b) receiving the outputs from said second selection means as multiplicands, (c) multiplying the multipliers and multiplicands, and (d) outputting the results of said multiplication;

third selection means for selecting an output from said multiplier and supplying the output to said storing means in said remaining periods, and for selecting outputs from said storing means in the burst and image periods to constitute a cyclic state;

adding means for adding the output results from said multiplier in said image period and for outputting the result of said addition; and separation circuit means for separating a color difference signal into R−Y and B−Y signals in accordance with the adding result of said adding means.

4. A circuit according to claim 3, wherein said storing means includes a dynamic shift register.

* * * * *